United States Patent
Kennedy et al.

(10) Patent No.: US 10,823,515 B2
(45) Date of Patent: Nov. 3, 2020

(54) TUBE-TO-HEADER SLIP JOINT FOR AIR-TO-AIR AFTERCOOLER

(71) Applicant: Caterpillar Inc., Peoria, IL (US)

(72) Inventors: Joseph L. Kennedy, Peoria, IL (US); Christian Earl Sabotta, Washington, IL (US); Nirag Sheth, Peoria, IL (US); James McCoy Voelker, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/426,554

(22) Filed: Feb. 7, 2017

(65) Prior Publication Data

US 2018/0224221 A1     Aug. 9, 2018

(51) Int. Cl.
*F28F 9/06* (2006.01)
*F16L 21/00* (2006.01)
(Continued)

(52) U.S. Cl.
CPC ............ *F28F 9/06* (2013.01); *F28D 1/05383* (2013.01); *F28F 1/025* (2013.01); *F16L 21/002* (2013.01); *F16L 39/04* (2013.01); *F28D 2021/0082* (2013.01); *F28F 9/0224* (2013.01); *F28F 2230/00* (2013.01); *F28F 2240/00* (2013.01);
(Continued)

(58) Field of Classification Search
CPC ........ F28F 1/26; F28F 1/24; F28F 1/30; F28F 1/32; F28F 9/0282; F28F 9/06; F28F 9/08; F28F 9/12; F28F 9/04; F28F 1/006; F28F 1/025; F28F 1/22; F28F 9/013; F28F 2230/00; F28F 2280/02; F16L 21/002; F16L 39/04

USPC ....... 165/51, 153, 173, 178, 181; 285/124.1, 285/124.2, 124.3, 124.4, 206, 207, 208
See application file for complete search history.

(56) References Cited

U.S. PATENT DOCUMENTS 3,081,102 A * 3/1963 Murray ................. F16L 17/025
                                                              277/607
3,325,174 A * 6/1967 Weaver ................. F16J 15/106
                                                              277/604
(Continued)

FOREIGN PATENT DOCUMENTS

CN       2839777 Y      11/2006
EP       1101992 A2      5/2001
(Continued)

OTHER PUBLICATIONS

Fastserv Supply; website; 2016; https://www.fastservsupply.com/repair-terminals/fastserv-20-18-awg-725-mm-od-gray-silicone-metri-pack-series-individual-round-press-fit-1-way-loose-cable-seal.htm.

*Primary Examiner* — Leonard R Leo
(74) *Attorney, Agent, or Firm* — Miller, Matthias & Hull (57) ABSTRACT

An air-to-air aftercooler (ATAAC) configured to cool compressed air from an air compressor is disclosed. The ATAAC may comprise a header at a cold end, and a plurality of core tubes. Each of the core tubes may have a first end and a second end. The ATAAC may further comprise a plurality of grommets each connecting the second end of one of the core tubes to a slot of the header. Each of the grommets may include an inner surface contacting the core tube and an outer surface contacting the slot of the header. The inner surface of the grommet may include radially-inwardly projecting regions contacting the core tube, and depressed regions providing clearance between the grommet and the core tube.

19 Claims, 5 Drawing Sheets

(51) Int. Cl.
*F16L 39/04* (2006.01)
*F28F 1/02* (2006.01)
*F28D 1/053* (2006.01)
F28D 21/00 (2006.01)
F28F 9/02 (2006.01)

(52) U.S. Cl.
CPC ....... *F28F 2275/08* (2013.01); *F28F 2280/02* (2013.01); *Y02T 10/12* (2013.01)

(56) References Cited

U.S. PATENT DOCUMENTS

| | | | | | |
|---|---|---|---|---|---|
| 3,573,871 | A | * | 4/1971 | Warner | F16L 17/025 277/607 |
| 3,741,570 | A | * | 6/1973 | Garrett | F16L 21/03 277/503 |
| 4,164,255 | A | * | 8/1979 | Binet | F28F 9/06 16/2.1 |
| 4,191,244 | A | * | 3/1980 | Keske | F28F 9/06 165/69 |
| 4,236,577 | A | * | 12/1980 | Neudeck | F28F 9/06 165/175 |
| 4,738,310 | A | * | 4/1988 | Luttenberger | F28F 9/14 165/133 |
| 4,815,535 | A | * | 3/1989 | Hagemeister | F28D 7/06 165/163 |
| 5,433,268 | A | * | 7/1995 | Janezich | F28D 1/053 165/175 |
| 5,490,560 | A | * | 2/1996 | Helms | F28F 9/0226 165/153 |
| 5,538,079 | A | | 7/1996 | Pawlick | |
| 5,954,345 | A | | 9/1999 | Svoboda et al. | |
| 6,374,911 | B1 | * | 4/2002 | Olson | F28F 9/0226 165/134.1 |
| 8,215,015 | B2 | * | 7/2012 | Lesage | B21D 53/085 165/153 |
| 8,692,122 | B2 | | 4/2014 | Suzuki | |
| 2004/0068870 | A1 | * | 4/2004 | Smith | B23P 15/26 29/890.043 |
| 2007/0227140 | A1 | | 10/2007 | Bates et al. | |
| 2014/0300061 | A1 | * | 10/2014 | Gopireddy | F28F 9/06 277/607 |

FOREIGN PATENT DOCUMENTS

WO 9636844 11/1996
WO 2013081307 A1 6/2013

* cited by examiner

TUBE-TO-HEADER SLIP JOINT FOR AIR-TO-AIR AFTERCOOLER

TECHNICAL FIELD

The present disclosure generally relates to air-to-air aftercoolers and, more specifically, to air-to-air aftercoolers having tube-to-header slip joints.

BACKGROUND

Engine systems for many machines, vehicles, and equipment include an air intake system that delivers intake air to an internal combustion engine for combustion with fuel. The air intake system may include an air compressor that pressurizes the intake air to force more air into the engine for combustion. At higher engine power densities, the temperature of the compressed air at the compressor outlet may approach or even exceed 350° C. Even higher compressor outlet temperatures may exist with higher engine power densities in newer engine designs.

To cool the compressed air before introduction into the engine, the air intake system may also include an air-to-air aftercooler (ATAAC) downstream of the air compressor. The ATAAC may include an inlet end (or a hot end) where the hot compressed air enters the cooler, an outlet end (or a cold end) where the cooled compressed air exits the cooler, and a core assembly of tubes that transport the compressed air from the hot end to the cold end. The compressed air flowing through the tubes may be cooled by heat exchange with cooler ambient air flowing around the outside of the tubes. The tubes of the core assembly may be arranged in rows and connected to a first header at the hot end and a second header at the cold end using mechanical connections, brazed connections, or sliding engagements using rubber composite grommets. For instance, the composite grommets may fit into slots of the headers, and the tubes may be inserted into the composite grommets to provide "slip" joints that permit the tubes to slide axially with thermal expansion and contraction. The degree of tube growth with thermal expansion may be greater in ATAACs compared with tube growth in radiators.

While effective, current composite grommets may contact the tubes over large contact areas. In some cases, the composite grommets may contact the tubes along the entire length of the grommet from an upper rim to a lower rim. The large contact area between the grommets may increase friction, thereby increasing the required load or force needed to allow the tube to "slip" within the grommet. The increased load or force may cause the grommet to wear or exhibit material failure, possibly leading to air leaks between the grommets and the tubes. In addition, the increased load or force may cause the grommet to disengage from or pull out of the header.

U.S. Pat. No. 5,954,345 discloses a grommet for a transmission oil fill tube through which the tube can be advanced to form a seal between the tube and the transmission case. The grommet includes ribs along an outer wall and inner wall. However, the grommet is not used to connect an ATAAC tube to a header. Clearly, there is a need for improved grommet designs for tube-to-header slip joints in ATAACs.

SUMMARY

In accordance with one aspect of the present disclosure, an air-to-air aftercooler (ATAAC) configured to cool compressed air from an air compressor is disclosed. The ATAAC may have a hot end configured to receive the compressed air from the air compressor, and a cold end configured to release the cooled compressed air. The ATAAC may comprise a first header at the hot end, and a second header at the cold end. The second header may include a plurality of slots. The ATAAC may further comprise a plurality of core tubes configured to carry the compressed air from the hot end to the cold end. Each of the core tubes may extend between the first header and the second header, and each of the core tubes may have a first end and a second end. The ATAAC may further comprise a plurality of grommets each connecting the second end of one of the core tubes to a respective one of the slots of the second header. Each of the grommets may be inserted into a respective one of the slots of the second header, and may include an inner surface contacting the core tube and an outer surface contacting the slot of the second header. The inner surface of the grommet may include radially-inwardly projecting regions contacting the core tube, and depressed regions providing clearance between the grommet and the core tube.

In accordance with another aspect of the present disclosure, a machine is disclosed. The machine may comprise an internal combustion engine, and an air intake system configured to direct intake air to the internal combustion engine. The air intake system may include an air compressor configured to pressurize and increase a temperature of the intake air. The machine may further comprise an air-to-air aftercooler (ATAAC) downstream of the air compressor and configured to cool the compressed air from the air compressor. The ATAAC may include a first header at a hot end of the ATAAC, and a second header at a cold end of the ATAAC. The second header may include a plurality of slots. The machine may further comprise a plurality of core tubes extending between the first header and the second header, and each of the core tubes may have a first end and a second end. The machine may further comprise a plurality of slip joints each connecting the second end of one of the core tubes to a respective one of the slots of the second header. The slip joints may permit the core tubes to slide axially within the slots with thermal expansion and contraction. Each of the slip joints may include a grommet inserted into one of the slots of the second header. The grommet may extend along an axis and include an inner surface contacting the core tube and an outer surface contacting the slot of the second header. The inner surface of the grommet may include radially-inwardly projecting regions contacting the core tube, and depressed regions providing clearance between the grommet and the core tube.

In accordance with another aspect of the present disclosure, a method of connecting a core tube to a header at a cold end of an air-to-air aftercooler (ATAAC) is disclosed. The method may comprise inserting a grommet into a slot of the header. The grommet may be formed from a composite material, and may include and inner surface and an outer surface contacting the slot of the second header. The inner surface of the grommet may include radially-inwardly projecting regions and depressed regions. The outer surface of the grommet may include a radially-outwardly projecting rib. The method may further comprise inserting an end of the core tube into the grommet so that the radially-inwardly projecting regions contact the core tube and the depressed regions are spaced from the core tube. The method may further comprise locking the grommet in the slot by engaging the radially-outwardly projecting rib with a chamfer in the slot of the header.

These and other aspects and features of the present disclosure will be more readily understood when read in conjunction with the accompanying drawings.

DETAILED DESCRIPTION

Figure 1:
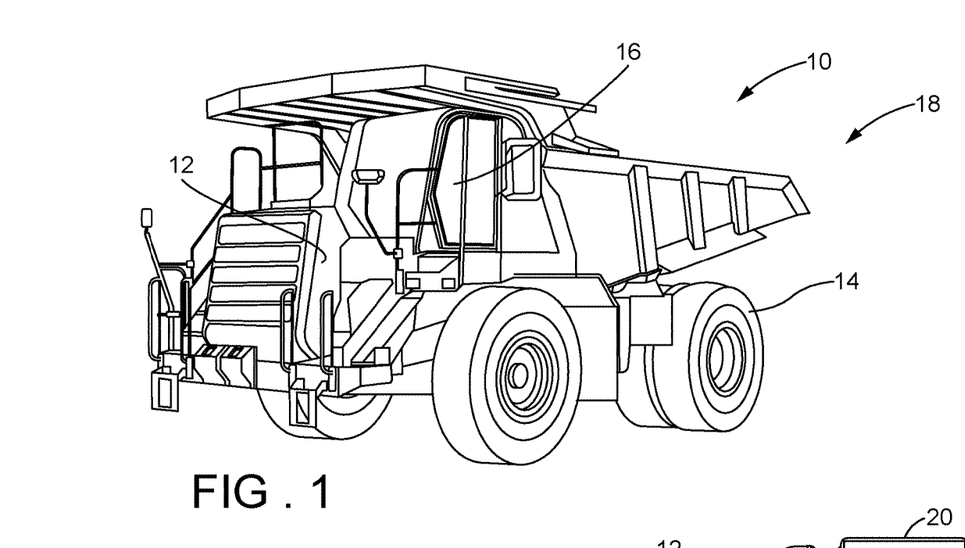
FIG. 1 is a perspective view of a machine, constructed in accordance with the present disclosure.

Referring now to the drawings, and with specific reference to FIG. 1, a machine 10 is shown. In general, the machine 10 may include an internal combustion engine 12 to provide power to drive the movement of the machine 10, as well as other optional features such as wheels 14 (or tracks), and an operator control station 16. For example, the machine 10 may be a mining truck 18, although it may be other types of mobile or stationary machines as well such as, but not limited to, a wheel loader, an excavator, a dozer, a drill machine, an electric shovel, or a material handler. In other examples, the machine 10 may be any type of mobile or stationary machine (manned or unmanned) that includes an air-to-air aftercooler (ATAAC) 20 (see FIG. 2) to cool compressed intake air.

Figure 2:
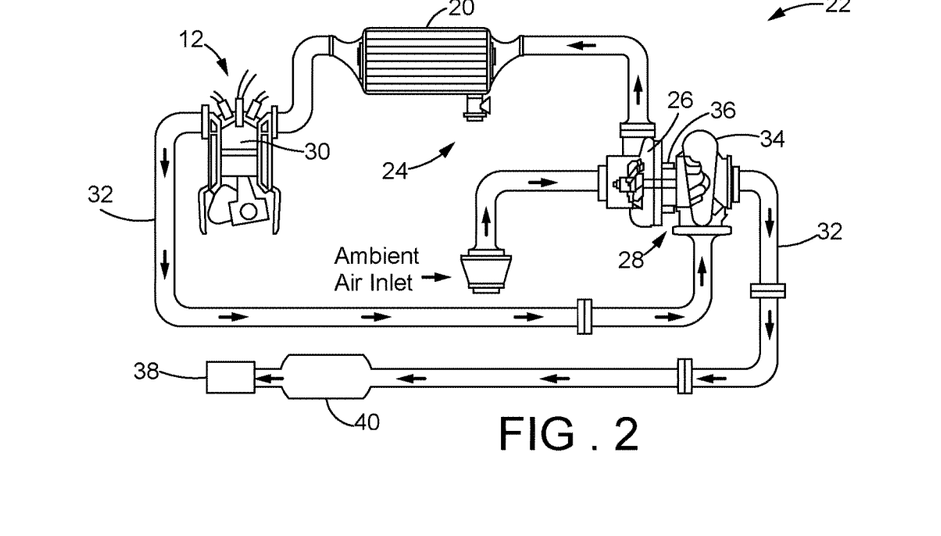
FIG. 2 is a schematic representation of an engine system of the machine, constructed in accordance with the present disclosure.

Turning to FIG. 2, an engine system 22 of the machine 10 is shown. The engine system 22 may include an air intake system 24 that directs intake air to the internal combustion engine 12 for combustion. The air intake system 24 may include an air compressor 26, which is part of a turbocharger 28, that pressurizes and increases the temperature of the intake air, as well as the ATAAC 20 that cools the pressurized intake air released from the air compressor 26 prior to delivery to the engine 12. Depending on the engine power density, the temperature of the intake air at the outlet of the air compressor 26 may approach or exceed 350° C., with higher engine power densities leading to higher compressor outlet temperatures. The ATAAC 20 may cool the pressurized intake air substantially, and the cooled intake air may be delivered to one or more combustion chambers 30 of the engine 12 for combustion with fuel. In some arrangements, the ATAAC 20 may cool pressurized intake air to about 100° C. or less.

Exhaust gases produced from the combustion may be released from the combustion chamber(s) 30 through one or more exhaust lines 32, and may drive the rotation of a turbine 34 of the turbocharger 28. The turbine 34, in turn, may drive the rotation of the air compressor 26 through an interconnecting shaft 36, causing the air compressor 26 to draw in and pressurize more intake air. The exhaust gases may then be expelled from the system 22 through an exhaust pipe 38 after passing through a muffler 40. It will be understood that the engine system 22 may optionally include additional components apparent to those with ordinary skill in the art such as, but not limited to, filters, valves, exhaust gas recirculation systems, and exhaust aftertreatment components.

Figure 3:
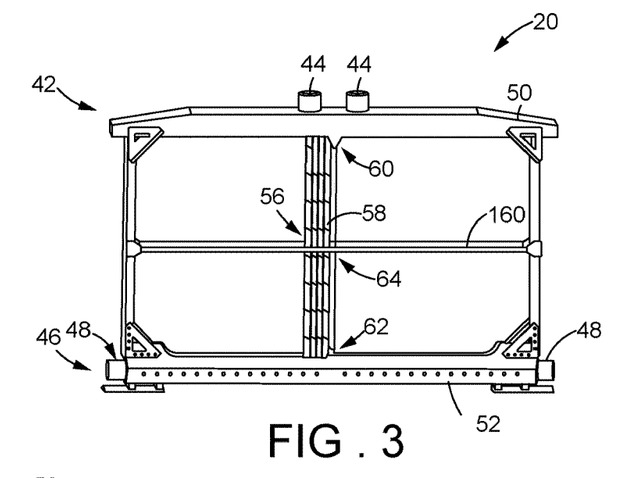
FIG. 3 is a side view of an air-to-air aftercooler (ATAAC) of the engine system with many of the core tubes of the ATAAC removed for clarity, constructed in accordance with the present disclosure.

Referring now to FIG. 3, the ATAAC 20 is shown in isolation. The ATAAC 20 may include an inlet end (or a hot end) 42 having one or more inlets 44 that receives the hot intake air from the air compressor 26, as well as an outlet end (or a cold end) 46 having one or more outlets 48 through which the cooled intake air is released after cooling. The inlet end 42 may include a first header 50, and the outlet end 46 may include a second header 52. Between the first header 50 and the second header 52 may be a core assembly 56 consisting of a plurality of core tubes 58 that extend between the first header 50 and the second header 52. The intake air may flow through the core tubes 58 from the inlet end 42 to the outlet end 46, during which the intake air may undergo heat exchange with cooler ambient air flowing around the outside of the tubes 58.

Figure 4:
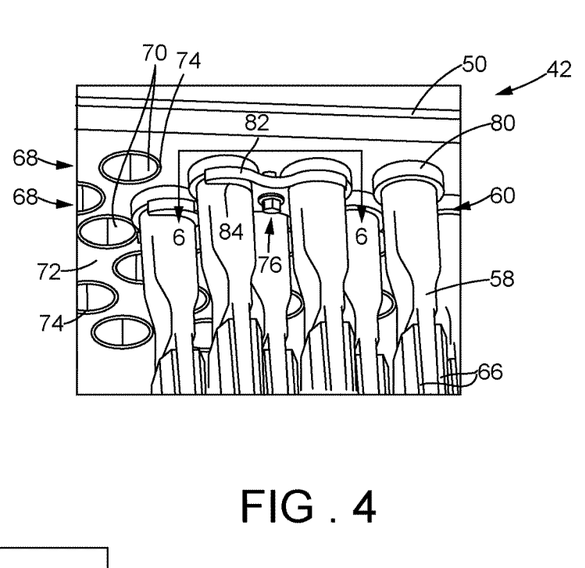
FIG. 4 is a perspective view of mechanical joints between the core tubes and a first header at an inlet end (or a hot end) of the ATAAC, constructed in accordance with the present disclosure.
Figure 5:
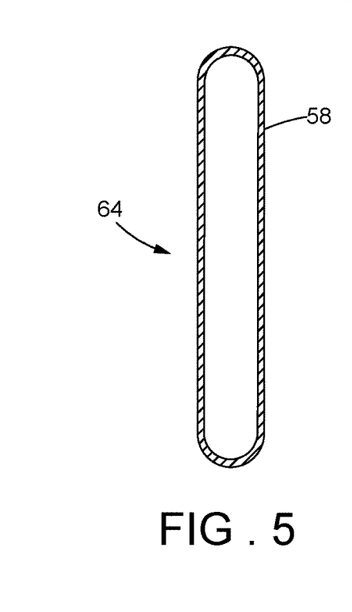
FIG. 5 is a cross-sectional view through a center portion of one of the core tubes, constructed in accordance with the present disclosure.

Referring to FIGS. 3-5, the core tubes 58 may be separate parts that are not brazed together as in some ATAAC designs of the prior art. As such, the core tubes 58 may be individually serviced or replaced when damaged, without the need to replace the whole core assembly 56. Each of the core tubes 58 may include a first end 60, a second end 62 (also see FIG. 8), and a center portion 64 between the first end 60 and the second end 62. The first and second ends 60 and 62 of the core tubes 58 may have a circular cross-sectional shape. In addition, as shown in FIG. 5, the center portions 64 of the tubes 58 may have an oval cross-sectional shape. In some arrangements, the first and second ends 60 and 62 of the core tubes 58 may have a diameter of about one inch, although the core tubes 58 may have other dimensions as well. Along the center portions 64 of the tubes 58 may be fins 66 that facilitate heat exchange between the intake air flowing through the tubes 58, and ambient air flowing outside of the tubes 58. The core tubes 58 may be formed from a light-weight metallic material such as, but not limited to, aluminum or an aluminum alloy.

The first header 50 may be formed from a metallic material, such as steel or stainless steel. In addition, the first header 50 may have a plurality of rows 68 of slots 70 arranged in a staggered arrangement, with each of the slots 70 being configured to receive one of the core tubes 58. As used herein, a "staggered arrangement" refers to rows of slots that are offset from each other such that the slots/tubes of one row are between the slots/tubes of an immediately adjacent row (also see FIGS. 8 and 12). In addition, a surface 72 of the first header 50 that faces the core assembly 56 may include recessed grooves 74 each surrounding one of the slots 70 (see FIG. 4).

As shown in FIG. 4, the first ends 60 of each of the core tubes 58 may be received in a respective one of the slots 70 of the first header 50, and may be connected thereto with a mechanical joint 76. Advantageously, the components of the mechanical joint 76 may exhibit a temperature capability well in excess of 350° C. As explained further below, the components of the mechanical joint 76 may be formed from metallic materials that are stable at temperatures above 350° C. That is, the components of the mechanical joint 76 may not exhibit wear or material degradation at temperature above 350° C. Accordingly, the inlet end (or the hot end) 42 of the ATAAC 20 may be exposed to high intake air temperatures above 350° without failure.

Figure 6:
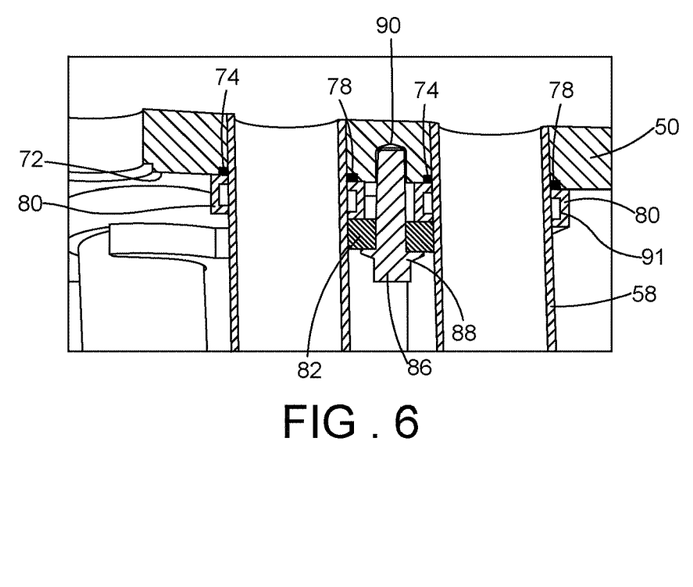
FIG. 6 is a cross-sectional view through the section 6-6 of FIG. 4, constructed in accordance with the present disclosure.
Figure 7:
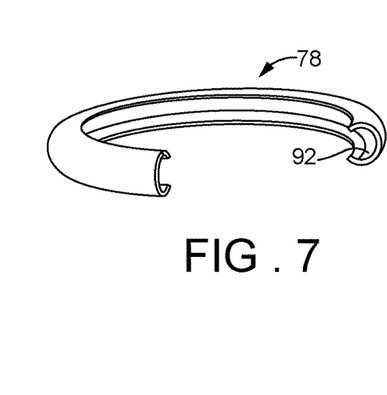
FIG. 7 is a perspective view of a C-ring of the mechanical joint, constructed in accordance with the present disclosure.

Referring to FIGS. 4 and 6-7, the mechanical joint 76 may include a C-ring 78 inserted into the recessed groove 74, a flange 80 at the first end 60 of the core tube 58, and a clamp 82 that is mechanically fastened to the first header 50. The clamp 82 may insert over the flange 80 to clamp the flange 80 and the C-ring 78 to the first header 50. When clamped, the flange 80 may engage with the surface 72 of the first header 50 to provide a seal that prevents the leakage of intake air between the core tube 58 and the first header 50. In some arrangements, the clamp 82 may be configured to clamp two of the core tubes 58 to the first header 50 (see FIG. 4). For example, the clamp 82 may include two openings 84 each configured to receive a first end 60 of one of the core tubes 58. In other alternative arrangements, the clamp 82 may clamp more than two or only one of the core tubes 58 to the first header 50. The clamp 82 may be fastened to the first header 50 using one or more mechanical fasteners 86, such as bolts 88 (or rivets), with the first header 50 having apertures 90 to receive the mechanical fasteners 86 (see FIG. 6). As a non-limiting example, the apertures 90 may be positioned between the slots 70 (see FIGS. 4 and 6). In other arrangements, the clamp 82 may be fastened to the first header 50 using other types of fasteners, such as screws.

The flange 80 may be a metallic ring around a portion of the first end 60 of the core tube 58 that is mechanically joined to the core tube 58. For instance, the core tube 58 may be internally expanded into the flange 80 to prevent air leakage between the core tube 58 and the flange 80. To improve the robustness of the joint between the flange 80 and the core tube 58 formed by internal expansion, an internal diameter of the flange 80 may have a groove 91 formed therein. In other cases, the flange 80 may be joined to the core tube 58 by brazing, welding, or another metal joining process apparent to those with ordinary skill in the art. The flange 80 may be formed from a metallic material, such as stainless steel, or another material that is harder than the aluminum material of the core tubes 58.

The clamp 82 may be formed from a high temperature capable metallic material such as, but not limited to, steel or stainless steel. The C-ring 78 may be formed from a high temperature capable and corrosion-resistant metallic material, such as stainless steel. In alternative arrangements, the C-ring 78 may be a spring-energized C-ring and may include a spring within a cavity 92 of the C-ring 78 as will be apparent to those with ordinary skill in the art (see FIG. 7). Alternatively, an O-ring may be used in place of the C-ring 78.

Figure 8:
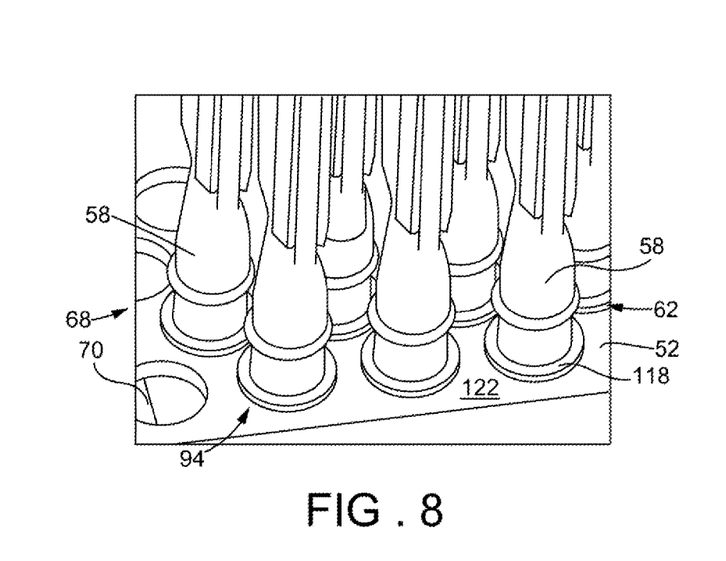
FIG. 8 is a perspective view of slip joints between the core tubes and a second header at an outlet end (or a cold end) of the ATAAC, constructed in accordance with the present disclosure.

Turning now to FIG. 8, the second header 52 may be formed from a metallic material, such as steel or stainless steel. In addition, the second header 52 may include a plurality of rows 68 of slots 70 in a staggered arrangement that is aligned with and mirrors the staggered arrangement of the rows 68 of slots 70 in the first header 50. Each of the slots 70 in the second header 52 may receive the second end 62 of one of the core tubes 58. As such, the first header 50 and the second header 52 may cooperate to support the core tubes 58 in the staggered arrangement. However, in contrast to the first ends 60 of the core tubes 58 which may be connected to the first header 50 with the more rigid mechanical joints 76, the second ends 62 of the core tubes 58 may be connected to the second header 52 with slip joints 94 that permit the core tubes 58 to slide axially within the slots 70 upon thermal expansion and contraction. Each of the slip joints 94 may include a grommet 96 inserted into one of the slots 70, with the grommet 96 receiving the second end 62 of the core tube 58 and permitting the second end 62 of the core tube 58 to slide axially therein.

Figure 9:
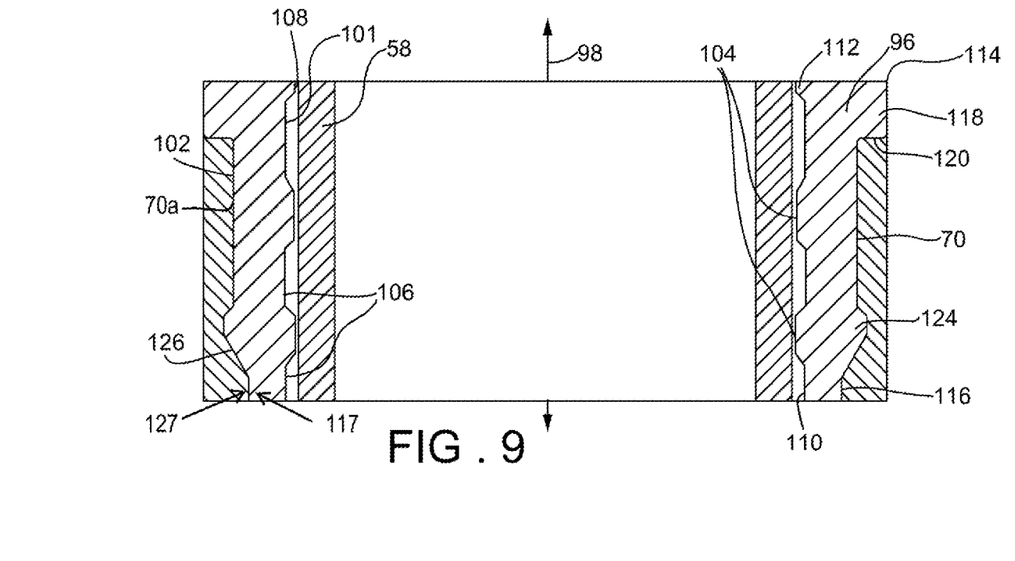
FIG. 9 is a cross-sectional view of the slip joint, constructed in accordance with the present disclosure.
Figure 10:
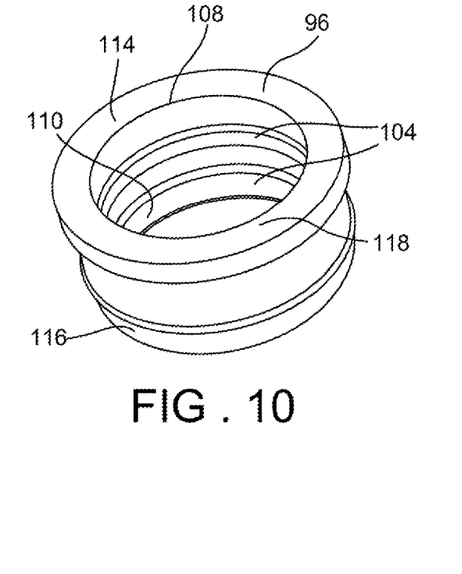
FIG. 10 is a perspective view of a grommet of the slip joint shown in isolation, constructed in accordance with the present disclosure.

The structure of the slip joint 94 and the grommet 96 is shown in further detail in FIGS. 9-10. The grommet 96 may extend along an axis 98 and may include an inner surface 101 that contacts the core tube 58, and an outer surface 102 that contacts the inner diameter 70*a* of the slot 70 (see FIG. 9). The inner surface 101 may include one or more radially-inwardly projecting regions 104 that contact the core tube 58, as well as one or more depressed regions 106 that project radially outward and provide clearance between the core tube 58 and the grommet 96 in the slip joint 94. That is, the depressed regions 106 may not form contacts with the core tube 58 in the slip joint 94, thereby substantially reducing the contact area between the grommet 96 and the core tube 58 compared to grommets of the prior art that have flat inner surfaces. As such, the friction or force required to slide the core tube 58 axially within the grommet 96 may be substantially reduced compared to prior art grommets with flat inner surfaces. The reduced friction or force required for the core tube 58 to slip within the grommet 96 may prevent wear or material failure of the grommet 96, thereby preventing air leakage, while also reducing the susceptibility of the grommet 96 to disengage from or pull out of the second header 52. In addition, the reduced friction required for the tube 58 to slip in the slip joint 94 may also reduce the amount of load or force that is transferred to the mechanical joints 76 at the inlet end 43. In this way, the mechanical joints 76 may be protected against potential failure and air leakage.

The radially-inwardly projecting regions 104 may extend along the inner surface 101 of the grommet 96 between an upper inner rim 108 and a lower inner rim 110. Although FIG. 9 shows two radially-inwardly projecting regions 104 along the inner surface 101, the grommet 96 may have more than two or only one radially-inwardly projecting region 104 in alternative arrangements. In some arrangements, the grommet 96 may have at least one radially-inwardly projecting region 104 near the lower inner rim 110, as shown in FIG. 9. At the upper inner rim 108 may be a radially-inwardly projecting rib 112 that projects from the inner surface 101 to contact the core tube 58 and prevent or block external debris from passing between the grommet 96 and the core tube 58.

Along the outer surface 102 of the grommet 96 may be an upper outer rim 114 and a lower outer rim 116. At the upper outer rim 114 of the grommet 96 may be a flange 118 that includes a lower lip 120 that contacts a surface 122 of the second header 52 that faces the core assembly 56 (also see FIG. 8). The engagement of the flange 118 with the surface 122 of the second header 52 may limit the depth of insertion of the grommet 96 into the second header 52 and prevent the grommet 96 from being pushed through the slot 70. Near the lower outer rim 116 may be a radially-outwardly projecting rib 124 that projects from the outer surface 102 and engages a chamfer 126 in the slot 70 of the second header 52. The engagement of the rib 124 with the chamfer 126 may lock the grommet 96 in the slot 70 of the second header 52, thereby preventing the grommet 96 from being pulled out of the second header 52. Moreover, the radially-inwardly projecting region 104 near the lower inner rim 110 may be located radially inward of the rib 124 so that the rib 124 is pressed into the chamfer 126 when the radially-inwardly projecting region 104 contacts the core tube 58. Further, the grommet 96 includes an inwardly projecting depressed region 117 proximate the lower outer rim 116 of the grommet that receives and engages an inwardly-projecting slot rib 127 that extends radially inwards from the inner diameter proximate the internal chamfer 126.

The grommet 96 may be formed from a composite material, such as a rubber composite material. In some arrangements, the composite material may include one or more fluoroelastomers. As a non-limiting possibility, the grommet 96 may be formed from FKM fluoroelastomer rubber. In other arrangements, the grommet 96 may be formed from other types of composite materials, metallic materials, or polymeric materials. Depending on its material composition, the grommet 96 may have a lower temperature capability than the metallic components of the mechanical joints 76 at the inlet (or hot) end 42 of the ATAAC 20. However, the grommet 96 may have a temperature capability sufficient to withstand the operating temperatures at the outlet (or cold) end 46 of the ATAAC 20 (e.g., about 100° C., although the temperature at the outlet end 46 may vary considerably from this in some circumstances).

Figure 11:
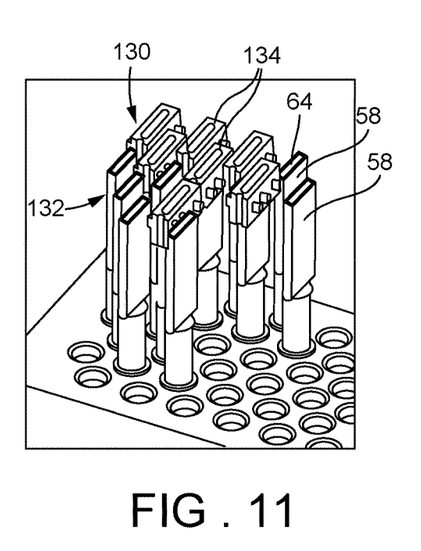
FIG. 11 is a perspective view of a portion of a core assembly of the ATAAC, constructed in accordance with the present disclosure.
Figure 12:
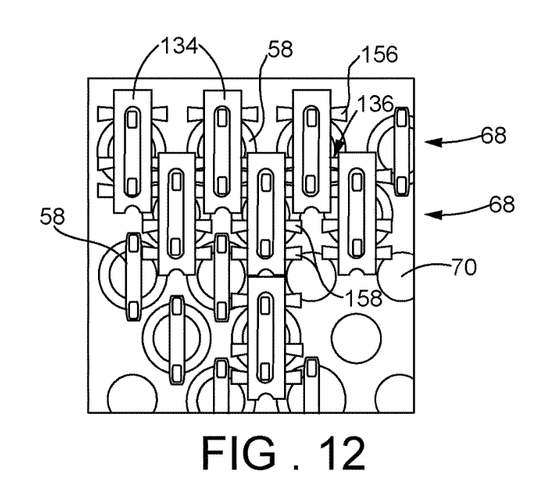
FIG. 12 is a top view of the core assembly of FIG. 11, constructed in accordance with the present disclosure.

Turning now to FIGS. 11-12, the core tubes 58 may be tightly packed within the core assembly 56 to meet the performance requirements of the ATAAC 20. To increase the packing density of the core tubes 58 in the core assembly 56, the rows 68 of the core tubes 58 may overlap with each other such that the core tubes 58 in each of the rows 68 protrude between the core tubes 58 of any immediately adjacent rows 68 (see FIG. 12). To support the core tubes 56 in such an arrangement, the ATAAC 20 may further include a clip assembly 130 at a center region 132 of the core assembly 56 (note that only a portion of the clip assembly 130 is shown in FIGS. 11-12 for clarity). The clip assembly 130 may include a plurality of clips 134 each clipped around the center portion 64 of one of the core tubes 58. In particular, the clips 134 may be clipped around a portion of the center portion 64 that lacks the fins 66. As explained further below, the clips 134 of the clip assembly 130 may removably interconnect with each other by forming male-female connections 136 (see FIG. 12). Notably, the clips 134 may have a symmetrical structure, and may be identical to each other to allow the core tubes 58 to be interconnected with a single part number. The clips 134 may be formed from a molded plastic material, although other types of suitable materials (e.g., composite materials, metallic materials, etc.) may also be used.

Figure 13:
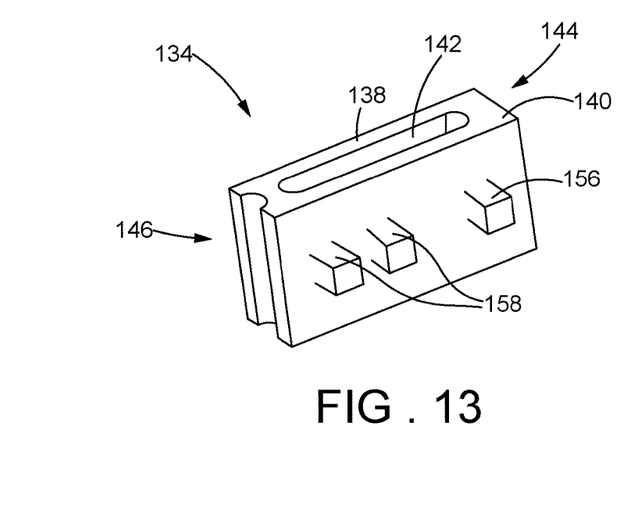
FIG. 13 is a perspective view of a clip used to support the core tubes of the core assembly, constructed in accordance with the present disclosure.
Figure 14:
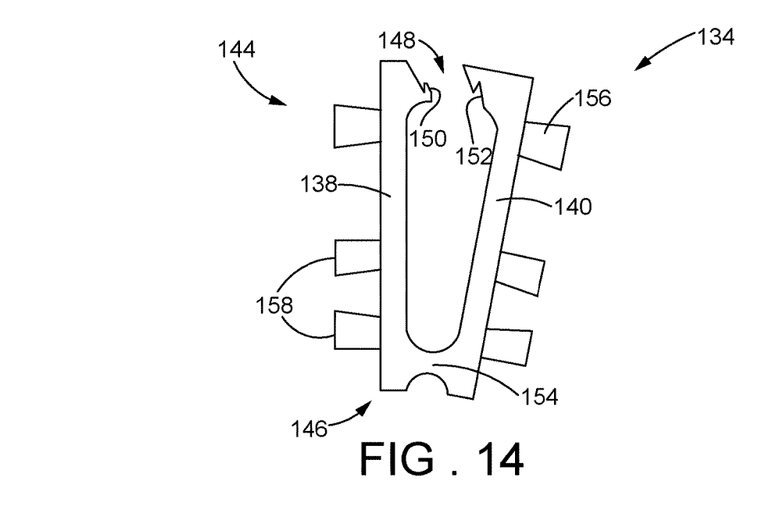
FIG. 14 is a side view of the clip in an open position, constructed in accordance with the present disclosure.

As shown in FIGS. 13-14, each of the clips 134 may include symmetrical first and second bars 138 and 140, and a cavity 142 between the first and second bars 138 and 140 that is shaped to receive the center portion 64 of the core tube 58. The cavity 142 may be sized to surround the center portion 64 and form an interference fit with the core tube 58. As such, the cavity 142 may have a shape complimentary to the center portion 64 of the core tube 58. For example, if the center portion 64 has an oval cross-sectional shape (see FIG. 5), the cavity 142 may also have an oval shape with slightly larger dimensions.

In addition, each of the clips 134 may include a first end 144 and a second end 146, with the first end 144 having a clipping feature 148 configured to lock the clip 134 around the core tube 58. In particular, the clipping feature 148 may include an engagement between a first edge 150 of the first bar 138 with a second, complimentary edge 152 of the second bar 140. For instance, the edges 150 and 152 may be complimentary jagged edges. In alternative arrangements, the clipping feature 148 may include other types of complimentary edges or locking arrangements. At the second end 146 of the clip 134 may be a hinge portion 154 that permits the first and second bars 138 and 140 to hinge between a closed position (see FIG. 13) and an open position (see FIG. 14). That is, the clip 134 may be hinged to the open position to allow insertion of the core tube 58 into the cavity 142, and the clip 134 may be hinged to the closed position to lock the clip 134 around the core tube 58. The hinge portion 154 may include a region of the second end 146 having a reduced material thickness.

Referring now to FIGS. 12-14, the first and second bars 138 and 140 of the clip 134 may each include a male connector 156 near the first end 144 (and the clipping feature 148), and a female connector 158 near the second end 146 (and the hinge portion 154). As such, the male connectors 156 of each of the clips 134 may connect to the female connectors 158 of the clips 134 in any immediately adjacent rows 68 (see FIG. 12). More specifically, in the overlapping, staggered arrangement of the core tubes 58, the first end 144 of the clip 134 may protrude between two of the clips 134 in an immediately adjacent row 68 and may connect to the female connectors 158 of the two clips 134 (see FIG. 12). In addition, the second end 146 of the clip 134 may protrude between two of the clips 134 in an immediately adjacent row 68 and connect to the male connectors 156 of the two clips 134. It will be understood, however, that at corners and edges of the core assembly 56, the male connectors 156 and the female connectors 158 of the clips 134 may be engaged with another structure (e.g., a support cross-bar 160 (see FIG. 3)), or may be unengaged. In alternative designs, the clips 134 may have the female connectors 158 at the first end 144 (near the clipping feature 148) and the male connectors 156 at the second end 146 (near the hinge portion 154). In yet other arrangements, the clips 134 may be removably connected to each other by other types of connections apparent to those with ordinary skill in the art. Variations such as these also fall within the scope of the present disclosure.

INDUSTRIAL APPLICABILITY

In general, the teachings of the present disclosure may find broad applicability in many industries including, but not limited to, mining, agriculture, construction, and earth-moving equipment industries. For example, the present disclosure may find applicability in any industry using machines or equipment that use an ATAAC to cool intake air at an air compressor outlet, particularly machines or equipment having high (>300° C.) compressor outlet temperatures.

Figure 15:
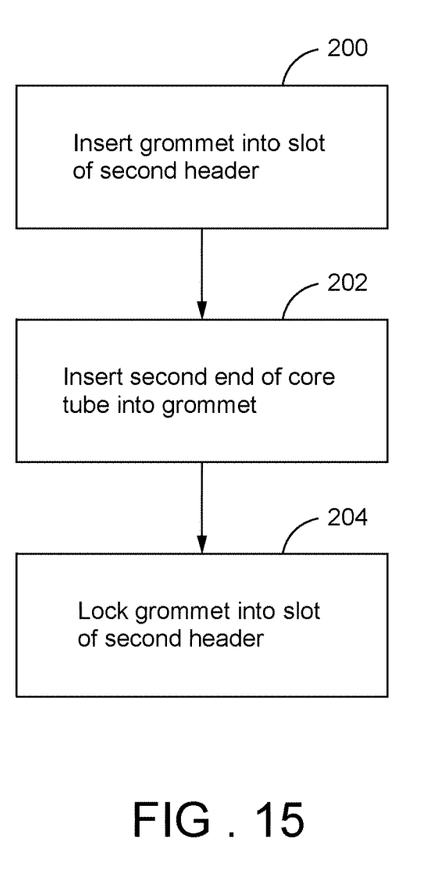
FIG. 15 is a flowchart of a series of steps involved in connecting the core tubes to the second header, in accordance with a method of the present disclosure.

Turning to FIG. 15, steps that may be involved in connecting the second end 62 of the core tube 58 to the second header 52 using the slip joint 94 is shown. It will be understood that the method of FIG. 15 may be repeated as needed to connect all of the core tubes 58 of the core assembly 56 to the second header 52. Beginning at a block 200, the grommet 96 may be inserted into the slot 70 of the second header 52 until the flange 118 along the upper outer rim 114 contacts the surface 122 of the second header 52. At a next block 202, the second end 62 of the core tube 58 may be inserted into the grommet 96 to allow contacts between the core tube 58 and the radially-inwardly projecting regions 104 (see FIG. 9). When the core tube 58 contacts the radially-inwardly projecting region 104 near the lower inner rim 110 of the grommet 96, the radially-outwardly projecting rib 124 may be pushed radially outward and form a tighter engagement with the chamfer 126 of the slot 70, thereby locking the grommet 96 in the slot 70 (block 204). Completion of the block 204 may provide the slip joint 94 between the core tube 58 and the second header 52, with the slip joint 94 permitting the core tube 58 to slip axially within the grommet 96 during thermal expansion and contraction.

Figure 16:
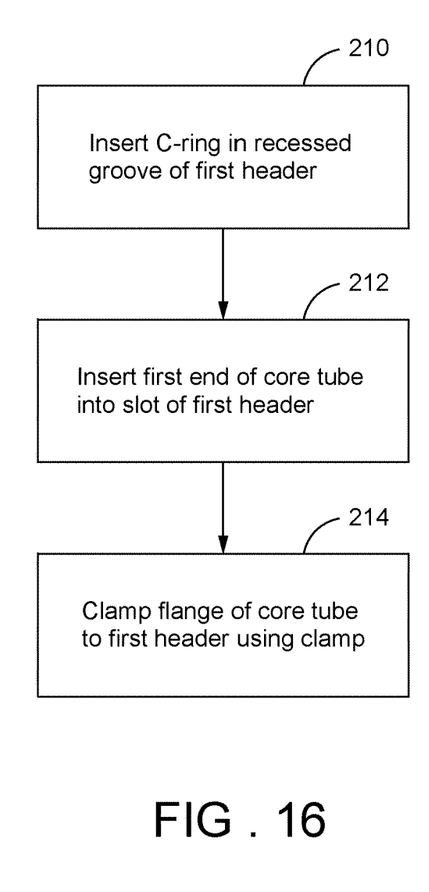
FIG. 16 is a flowchart of a series of steps involved in connecting the core tubes to the first header, in accordance with another method of the present disclosure.

FIG. 16 shows a series of steps involved in connecting one of the core tubes 58 to the first header 50 using the mechanical joint 76. At a first block 210, the C-ring 78 may be inserted into the recessed groove 74 surrounding the slot 70 of the first header 50. The first end 60 of the core tube 58 may then be inserted into the slot 70 according to a block 212. According to a next block 214, the flange 80 of the core tube 58 may be clamped to the first header 50 using the clamp 82 so that the flange 80 tightly engages the surface 72 of the first header 50 to prevent air leakage between the core tube 58 and the first header 50 (see FIG. 6). The block 214 may involve mechanically fastening the clamp 82 to the header 50 using the bolt 88 received in the aperture 90 of the first header 50 (see FIG. 6). In some arrangements, the clamp 82 may clamp two of the flanges 80 of neighboring core tubes 58 to the first header 50 (see FIG. 4). Completion of the block 214 may provide the mechanical joint 76 between the core tube 58 and the first header 50. The method of FIG. 16 may be repeated as needed to connect all of the core tubes 58 of the core assembly 56 to the first header 50.

Figure 17:
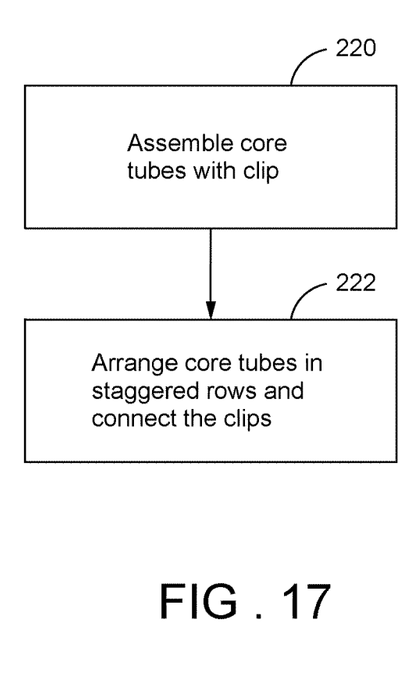
FIG. 17 is a flowchart of a series of steps involved in assembling the core assembly using the clips, constructed in accordance with the present disclosure.

Steps that may be involved in assembling the core assembly 56 using the clips 134 are shown in FIG. 17. At a first block 220, each of the core tubes 58 of the core assembly 56 may be assembled with one of the clips 134. The block 220 may be achieved by opening each of the clips 134 at the hinge portion 154, inserting the center portion 64 of the core tube 58 into the cavity 142 of the clip 134, and then locking the clip closed around the core tube 58 using the clipping feature 148. According to a next block 222, the core tubes 58 may then be arranged in the overlapping staggered rows 68 and connected using the clips 134. That is, the male connectors 156 of each clip 134 may be connected between the female connectors 158 of two clips 134 in an immediately adjacent row to support the core tubes 58 in the overlapping, staggered arrangement.

The ATAAC disclosed herein includes mechanical joints with a high temperature capability (>350° C.) to connect the core tubes to the first header at the inlet (or hot) end of the ATAAC. Accordingly, the ATAAC disclosed herein may be compatible with engine designs having high power densities and high compressor outlet temperatures. The core tubes of the ATAAC are individual components that are not brazed together as in some prior art designs. As such, damaged core tubes may be individually serviced and/or replaced without the need to replace the entire core assembly. Furthermore, the core tubes may be formed from aluminum or an aluminum alloy to substantially reduce the weight and cost of manufacture of the ATAAC compared to copper, brass, or stainless steel core tubes of the prior art. At the outlet (or cold) end of the ATAAC, the core tubes may be connected to the second header using slip joints that permit the core tubes to slip axially with thermal expansion and contraction. The slip joints include a grommet that contacts with core tube with a reduced contact area compared to grommet designs of the prior art. The reduced contact area reduces the amount of force or friction needed to allow the core tube to slip within the grommet. In this way, material wear of the grommet and/or the susceptibility of the grommet to disengage from the second header may be significantly reduced. Moreover, the amount of force or load that is transferred to the mechanical joints at the first header may also be reduced, thereby protecting the mechanical joints from failure and/or air leakage. Furthermore, the core tubes may be supported in overlapping, staggered rows using clips that interconnect with male-female connections. The clips may have a symmetrical structure and may be identical to each other, such that the core assembly may be assembled using a single clip part number. The clips allow the core tubes to be assembled in a more tightly packed configuration, allowing improvement of ATAAC performance.

It is expected that the technology disclosed herein may find wide industrial applicability in a wide range of areas such as, but not limited to, mining, agriculture, construction, and earth-moving equipment applications.

What is claimed is:

1. An air-to-air aftercooler (ATAAC) configured to cool compressed air from an air compressor, the ATAAC having a cold end configured to release the cooled compressed air, comprising:

a header at the cold end, the header including a plurality of slots, each of the slots extending between an upper surface and a lower surface of the header and having an inner diameter extending along the slot from the upper surface to the lower surface parallel to a central axis of the slot, an internal chamfer along an inner surface of the slot at a location between the upper surface and the lower surface of the header, and an inwardly-projecting slot rib extending radially inwards from the inner diameter proximate the internal chamfer, the internal chamfer having a beveled edge protruding radially outwardly from the inner diameter;

a plurality of core tubes each having a first end and a second end; and a plurality of grommets each connecting the second end of one of the core tubes to a respective one of the slots of the header, each of the grommets being inserted into a respective one of the slots of the header and including an inner surface contacting one of the core tubes and an outer surface contacting the inner surface of the slot, the inner surface of each of the grommets each including radially-inwardly projecting regions contacting the core tubes and depressed regions providing clearance between the grommets and the core tubes, the outer surface of each of the grommets including a radially-outwardly projecting rib disposed in and engaged with the internal chamfer of the respective slot, the radially-outwardly projecting rib having a beveled edge complementary to the beveled edge of the internal chamfer of the respective slot, and the outer surface of each of the grommets further including a depressed region proximate a lower outer rim of the grommet projecting inward and engaging with the respective inwardly-projecting slot rib.

2. The ATAAC of claim 1, wherein each of the grommets further includes an upper inner rim along the inner surface, and wherein the upper inner rim includes a radially-inwardly projecting rib projecting from the inner surface that contacts the core tubes and blocks external debris from passing between the grommets and the core tubes.

3. The ATAAC of claim 2, wherein each of the grommets further includes an upper outer rim along the outer surface, and wherein the upper outer rim includes a flange that contacts the upper surface of the header.

4. The ATAAC of claim 3, wherein each of the grommets further includes a lower inner rim along the inner surface, and wherein at least one of the radially-inwardly projecting regions is near the lower inner rim.

5. The ATAAC of claim 4, wherein the radially-outwardly projecting rib projects from the outer surface near the lower outer rim.

6. The ATAAC of claim 5, wherein the radially-outwardly projecting rib engages the chamfer in the respective slot of the header to provide a lock between the grommets and the respective slot.

7. The ATAAC of claim 6, wherein the radially-inwardly projecting region near the lower inner rim is directly radially inward of the radially-outwardly projecting rib and directly opposes the radially-outwardly projecting rib.

8. The ATAAC of claim 7, wherein each of the grommets is formed from a material selected from a rubber composite material, one or more fluoroelastomers, metallic materials and polymeric materials.

9. The ATAAC of claim 8, wherein each of the core tubes are formed from a material selected from aluminum and an aluminum alloy.

10. An engine system, comprising:
an air-to-air aftercooler (ATAAC) downstream of an air compressor and configured to cool the compressed air from the air compressor, the ATAAC including a header at the cold end, the header including a plurality of slots, each of the slots extending between an upper surface and a lower surface of the header and having an inner diameter extending along the slot from the upper surface to the lower surface parallel to a central axis of the slot, an internal chamfer along an inner surface of the slot at a location between the upper surface and the lower surface of the header, and an inwardly-projecting slot rib extending radially inwards from the inner diameter proximate the internal chamfer, the internal chamfer having a beveled edge protruding radially outwardly from the inner diameter;
a plurality of core tubes each having a first end and a second end; and
a plurality of slip joints each connecting the second end of one of the core tubes to a respective one of the slots of the header, each of the slip joints permitting the core tubes to slide axially within the slots with thermal expansion and contraction, each of the slip joints including a grommet inserted into one of the slots of the header, the grommets extending along an axis and including an inner surface contacting one of the core tubes and an outer surface contacting the inner surface of the slot, the inner surface of the grommets each including radially-inwardly projecting regions contacting the core tubes and depressed regions providing clearance between the grommets and the core tubes, the outer surface of each of the grommets including a radially-outwardly projecting rib disposed in and engaged with the internal chamfer of the respective slot, the radially-outwardly projecting rib having a beveled edge complementary to the beveled edge of the internal chamfer of the respective slot, and the outer surface of each of the grommets further including a depressed region proximate a lower outer rim of the grommet projecting inward and engaging with the respective inwardly-projecting slot rib.

11. The engine system of claim 10, wherein the grommets are formed from a material selected from a rubber composite material, one or more fluoroelastomers, metallic materials and polymeric materials.

12. The engine system of claim 10, wherein the grommets are formed from a fluoroelastomer.

13. The engine system of claim 10, wherein each of the grommets further include an upper outer rim having a flange that contacts the upper surface of the header.

14. The engine system of claim 13, wherein each of the grommets further include an upper inner rim having a radially-inwardly projecting rib that contacts the core tubes and blocks debris from passing between the grommets and the core tubes.

15. The engine system of claim 14, wherein the radially-outwardly projecting rib projects from the outer surface near the lower outer rim, the radially-outwardly projecting rib engaging the chamfer in the respective slot of the header to provide a lock between the grommets and the slots.

16. The engine system of claim 15, wherein each of the grommets further include a lower inner rim, and wherein at least one of the radially-inwardly projecting regions is near the lower inner rim.

17. The engine system of claim 16, wherein the core tubes are individual components.

18. The engine system of claim 17, wherein the header includes a plurality of rows of the slots in a staggered arrangement, and wherein the rows of the slots overlap with each other such that the slots in each row protrude between the slots in immediately adjacent rows.

19. A method of connecting a core tube to a header at a cold end of an air-to-air aftercooler (ATAAC), comprising:
inserting a grommet into a slot of the header, the slot extending between an upper surface and a lower surface of the header and having an inner diameter extending along the slot from the upper surface to the lower surface parallel to a central axis of the slot, an internal chamfer along an inner surface of the slot at a location between the upper surface and the lower surface of the header, and an inwardly-projecting slot rib extending radially inwards from the inner diameter proximate the internal chamfer, the internal chamfer having a beveled edge protruding radially outwardly from the inner diameter; the grommet being formed from a composite material and including an inner surface and an outer surface contacting the inner surface of the slot of the header, the inner surface of the grommet including radially-inwardly projecting regions and depressed regions, the outer surface of the grommet including a radially-outwardly projecting rib, and the outer surface of the grommet further including a depressed region proximate a lower outer rim of the grommet projecting inwards and engaging with the respective inwardly-projecting slot rib;

inserting an end of the core tube into the grommet so that the radially-inwardly projecting regions contact the core tube and the depressed regions are spaced from the core tube; and locking the grommet in the slot by engaging the radially-outwardly projecting rib with the internal chamfer in the slot of the header, the radially-outwardly projecting rib having a beveled edge complementary to the beveled edge of the internal chamfer in the slot and engaging the inwardly-projecting slot rib with the depressed region of the grommet.

\* \* \* \* \*